July 23, 1957     A. H. COHRS ET AL     2,800,066
TURF PERFORATING AND AERATING MACHINE
Filed Oct. 23, 1952     2 Sheets-Sheet 1

INVENTORS
ARTHUR H. COHRS
HERBERT A. COHRS
LAWRENCE R. SMIEJA

July 23, 1957 A. H. COHRS ET AL 2,800,066
TURF PERFORATING AND AERATING MACHINE
Filed Oct. 23, 1952 2 Sheets-Sheet 2

INVENTORS
ARTHUR H. COHRS
HERBERT A. COHRS
LAWRENCE R. SMIEJA
BY Williamson, Williamson,
Schroeder & Adams ATTORNEYS

United States Patent Office 2,800,066
Patented July 23, 1957

2,800,066

TURF PERFORATING AND AERATING MACHINE

Arthur H. Cohrs, Herbert A. Cohrs, and Lawrence R. Smieja, Hopkins, Minn.; said Herbert A. Cohrs, assignor to said Arthur H. Cohrs and to said Smieja Application October 23, 1952, Serial No. 316,512

3 Claims. (Cl. 97—44)

This invention relates generally to a turf perforating and aerating machine.

In the past, there have been a number of turf perforating machines which have sought to produce the desired result of aerating the soil and permitting the moisture to seep down a sufficient depth to draw the roots of the grass deeper into the ground and produce a more durable turf. This is particularly true on golf greens where the extremely dense bent grass turf is used. While some of these machines have produced reasonably good results, none of them has been constructed in a manner to permit inexpensive manufacture thereof and none of the machines previously developed will produce the desired results even when working in adverse conditions such as extremely dry, hard soil or extremely wet, soggy soil.

It is therefore an object of our invention to provide a turf perforating machine constructed to operate efficiently in extremely dry turf as well as in extremely wet and soggy turf without damaging either the turf or the machine and is particularly constructed to permit inexpensive manufacture.

It is another object to provide a turf perforating machine wherein a pair of perforating tubes are simultaneously projected into penetrating position with provision for instant release of the downward projecting force if the resistance to penetration exceeds a predetermined limit.

It is a further object to provide a turf perforating machine provided with a plurality of individual pressure members adjustably mounted in fixed relation and disposed between the penetrating tubes in close association thereto, to prevent the turf surrounding said tubes from being drawn upwardly therewith upon withdrawal of the tubes from the ground.

More specifically, it is an object to provide a turf perforating machine of the continuous moving type having cam actuating mechanism for producing rectilinear shifting movement of the ground penetrating punching members during the period when the same have been projected into the ground to produce no relative movement of said punching members relative to the ground even though the machine continues to move continuously across the ground surface.

It is another object to provide a machine of the type described wherein the punches are all mounted on a frame adapted to be elevated above ground penetrating position even when the same are being reciprocated to permit the machine to be moved across a hard surfaced roadway or the like.

These and other objects and advantages of this invention will more fully appear from the following description made in connection with the accompanying drawings wherein like reference characters refer to the same or similar parts throughout the several views and in which:

Fig. 4 is a fragmentary vertical sectional view taken substantially along line 4—4 of Fig. 2 and showing only the punch elevating mechanism;

Fig. 5 is a fragmentary vertical transverse sectional view taken substantially along the line 5—5 of Fig. 1; and Fig. 6 is a fragmentary vertical sectional view showing in detail the punches and mounting member therefor.

Figure 1:
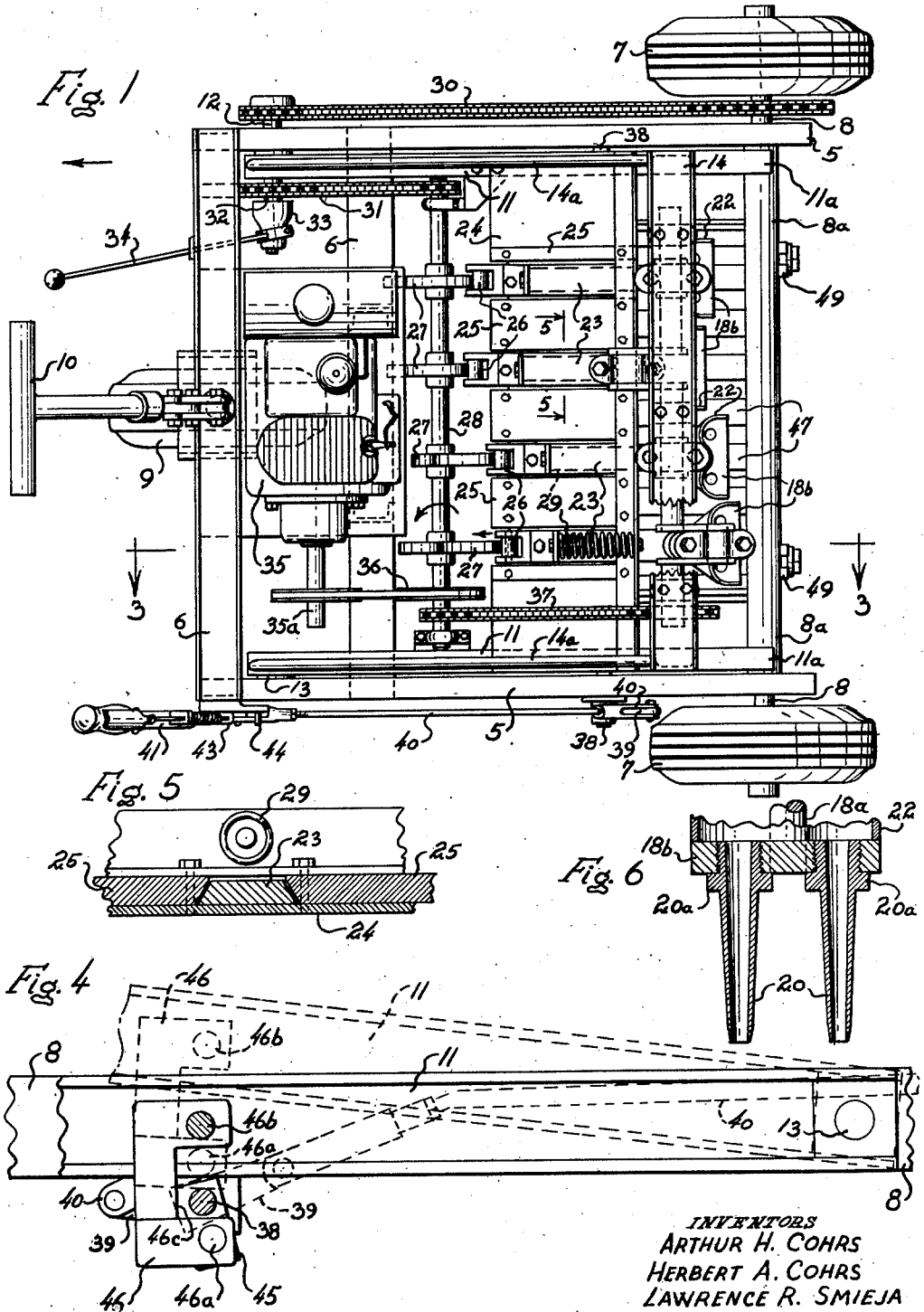
Fig. 1 is a top plan view of our machine.

As illustrated in the accompanying drawing, we provide a wheeled frame formed from a pair of longitudinal members 5 rigidly interconnected by the transverse members 6 and having a pair of rear wheels 7 fixed on a transversely disposed axle 8 which is journalled on the rear end portions of the longitudinal members 5. A front wheel 9 is mounted under the front cross members 6 and is constructed to steer the machine as by the combination pulling and steering handle 10. The machine is, of course, power driven as will be brought out hereinafter. However, the handle 10 is provided for adjustable hand positioning of the machine prior to engagement of the driving connection.

A second frame structure has a pair of longitudinal members 11 which are swingably mounted at their forward ends between the forward portions of the two side frame members 5 and extending rearwardly therefrom with the rear end portions 11a normally supported by a housing member 8a surrounding the portion of the rear axle 8 disposed between said side frame members 5. A wheel driving stub shaft 12 is journalled in one of the side frame members 5, as best shown in Fig. 1, and the rear portion of inner frame member 11 adjacent thereto is journalled for swinging movement on the stationary portion of the bearings in which said stub shaft 12 rotates. The other inner frame member 11 is merely pivotally mounted to the adjacent portion of outer frame member 5 as by a shaft element 13. The two shafts 12 and 13 are, of course, axially aligned as best shown in Fig. 1. An upstanding frame structure 14 is rigidly mounted on the pivotally mounted frame members 11 and extends upwardly therefrom. Suitable diagonal bracing 14a is provided to maintain the rigidity of the upstanding frame 14 relative to the pivotally mounted inner frame members 11.

Figure 3:
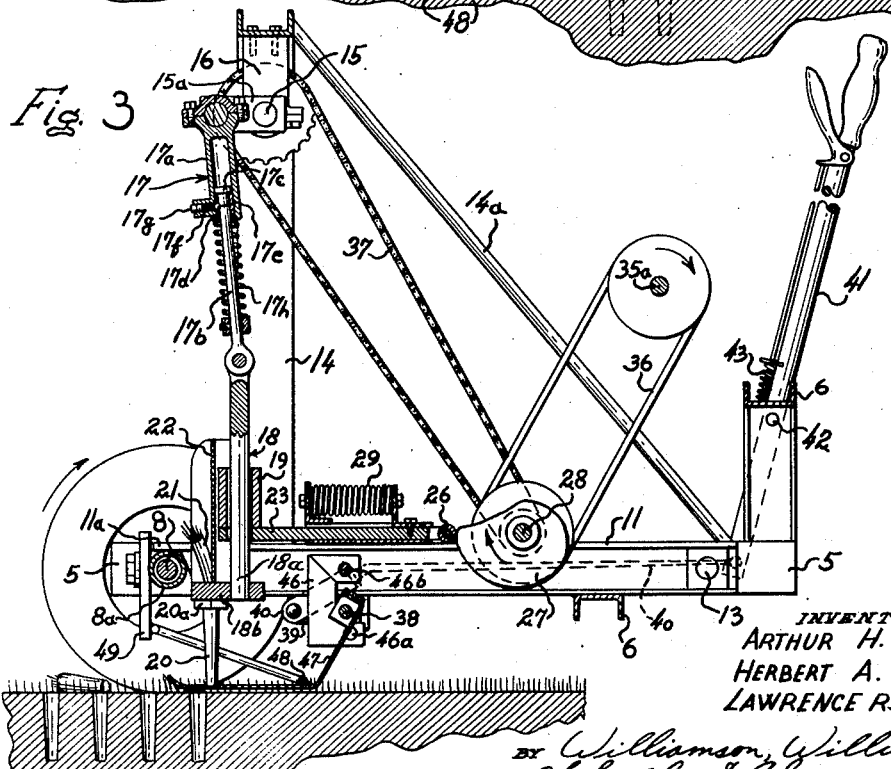
Fig. 3 is a vertical sectional view taken substantially along the line 3—3 of Fig. 1 and showing the punch unit in raised position.

A crank shaft designated as an entirety by the numeral 15 is journalled on said upstanding frame structure 14 as by suitable main bearings carried by bearing supports 16 which are mounted on the cross member of the frame structure 14. The crank shaft 15 has a plurality of actuating crank arms 15a and a connecting rod assembly 17 is journalled in a suitable manner on each of the crank arms 15a. Each of the connecting rod assemblies 17 is connected at its lower ends to a punch carrying member 18 which is reciprocated thereby. In the form shown, this punch carrying member 18 consists in a rod 18a slidably mounted in a guiding sleeve 19 for reciprocation therein and said rod 18a has a punch mounting block 18b fixed at the lower end thereof. This block is disposed in substantially horizontal position and, in the form shown, has a pair of transversely spaced apertures formed therethrough and positioned in longitudinally offset relation to said rod member 18a as by being disposed rearwardly thereof. Each of the apertures is internally threaded to receive a hollow punch 20 therein. Each of the hollow punches 20 is of course externally threaded at the upper portion thereof to permit the same to be removably attached to said mounting block 18b, as best shown in Figs. 3 and 6. A stop collar 20a provides an abutment shoulder on each of the hollow punches 20 and said punches are, as best shown in Figs. 3 and 6, tapered downwardly to facilitate removal from the ground and the hollow inside portion thereof is also larger in diameter at the top than at the bottom to prevent the punched-out cores 21 from becoming tightly wedged therein. A deflecting plate 22 is mounted in fixed relation on each of the blocks 18b and is disposed immediately forwardly of the apertures in which the punches 20 are mounted, as best shown in Fig. 3. As the crank shaft 15 is rotated, the rods 18a are vertically reciprocated in guide sleeves 19 and the position of the crank arms 15a is such that only one of the rods 18a will be projected downwardly into ground-penetrating position at a time so that only one pair of punches will be projected into the ground at a time. In other words, said crank arms 15a are positioned 90° apart in the form of the invention illustrated.

Each of the guiding sleeves 19 is mounted for horizontal reciprocation to move the punches 20 rearwardly while the same are in ground-penetrating position and to shift the same forwardly while the punches are disposed above the ground surface. A horizontal slide 23 is fixed to each of the sleeves 19 and is mounted in a suitable guiding groove provided in a fixed guide plate 24 which is securely mounted between the pivoted frame members 11. As best shown in Fig. 1, the slides 23 are disposed in parallel transversely spaced relation and each is provided with a guideway formed in the stationary plate 24 by any suitable means such as the removable overlying plates 25. In the form shown, the slides 23 have beveled longitudinal edge portions and the overlying plates 25 have cooperative beveled edge portions to provide an overlying dove-tail retaining guideway for each of said slides, as best shown in Fig. 5. The forward ends of each of the slides 23 have a cam following roller 26 and said rollers engage the respective cams 27 mounted on cam shaft 28, as best shown in Figs. 1 and 3. Suitable yieldable means are provided for retaining the rollers 26 in positive engagement with the peripheral surface of the respective cams 27, such as the compression springs 29. The cams 27 are of course designed to produce horizontal movement which is synchronized with the reciprocating movement produced by the crank shaft 15 and with the forward driving speed of the machine so that when the punches are in ground-penetrating position they will be projected rearwardly relative to the machine at exactly the same speed at which the machine is traveling forwardly to retain said punches in horizontally stationary position relative to the ground when the same are projected downwardly.

Suitable means are provided for driving the rear wheels 7 such as the chain and sprocket drive 30 between the rear axle 8 and stub shaft 12. A suitable chain and sprocket driving connection 31 is provided between the cam shaft 28 and an outwardly splined sleeve 32 which is journalled on stub shaft 12. An interiorly splined sleeve 33 is slidably received on the inner end portion of shaft 12 in splined relation thereto and is also adapted to be slidably received on the exteriorly received spline 32 to form a positive driving connection between the sleeve 32 and said shaft 12, thus providing a releasable clutch assembly for controlling the motion of the machine. A suitable pivotally mounted control lever 34 is provided for shifting the sleeve 33. This controllable clutch mechanism is of course of conventional design and forms no part of the patentable subject matter of our machine.

A suitable power source, such as the gasoline engine 35, has a drive shaft 35a which is connected by any suitable means, such as the belt and pulley drive 36, with the cam shaft 28, as best shown in Figs. 1 and 3. The cam shaft 28 has in turn a chain and sprocket driving connection 37 with the crank shaft 15 as best shown in Fig. 3.

Figure 2:
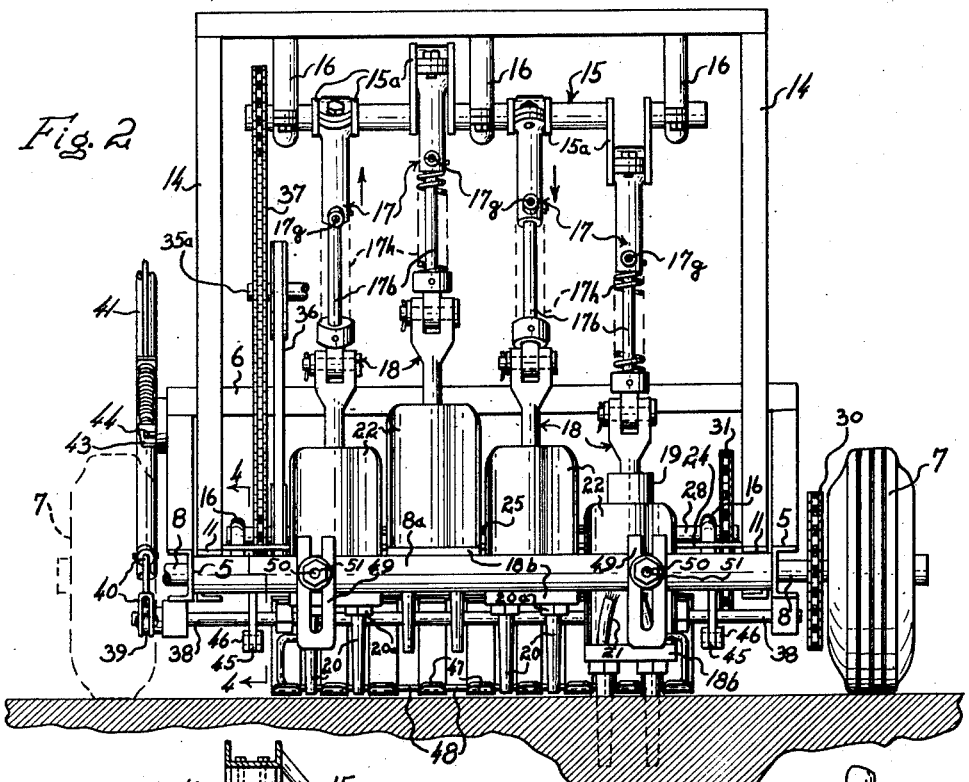
Fig. 2 is a rear elevational view thereof with the power unit not shown.

Suitable means for elevating the punch carrying mechanism is provided as will now be described. A rock shaft 38 is journalled on the fixed frame members 5, as best shown in Figs. 2 and 4, and an actuating bell crank 39 is fixed to said rock shaft 38 for oscillating the same. This bell crank 39 has an actuating link 40 pivotally connected therewith and said link is connected at its forward end with a control lever 41 which is pivotally mounted on the rigid supporting frame structure on the pivot pin 42 as best shown in Fig. 3. A retractable spring-pressed dog 43 is adapted to be received behind a suitable locking element such as the pin 44 best shown in Figs. 1 and 2 for holding the handle 41 in the desired frame retracting position. Obviously, this handle mechanism is of conventional design and forms no part of the patentable subject matter of this invention. An actuated bell crank 45 is fixed to each side of rock shaft 38, as best shown in Figs. 2, 3 and 4, and a C-shaped link 46, best shown in Figs. 3 and 4, has its lower arm portion pivotally connected with each of said actuated bell cranks as by the pin 46a. The upper ends of said C-shaped links are pivotally connected to the forward end portions of the swingably mounted longitudinal frame members 11 as by the pivot pins 46b. When the frame members 11 are lowered into operative position, it is necessary that the same be locked against upward shifting movement relative to the rigid frame members 5. This is accomplished by the actuated links 45 passing downwardly into over-center position and the intermediate edge portion 46c of the links 46 will then engage the respective rear edges of the respective actuated bell cranks 45 as best shown in Figs. 2 and 4, and positively hold the two frames rigidly together until said rock shaft is rotated by the actuating lever 41. This positioning of the intermediate edge 46a of C-shaped link 46 in the same vertical plane with the actuated bell crank 45 is accomplished by producing an attachment fork at the bottom of the C-shaped link, the arms of which are disposed on opposite sides of said actuated bell crank. When the lever handle is shifted forwardly, the rock shaft is rotated to swing the actuated bell cranks 45 forwardly and upwardly into the dotted position shown in Fig. 4 and the pivot pins 46b respectively connecting the links 46 with the swingably mounted frame members 11 are elevated and the frame members 11 are similarly elevated into the dotted position shown in Fig. 4. Obviously, there is no over-center action in elevated position so the spring pressed dog 43 and locking pin 44 are required to hold the actuating bell crank 40 in elevating position. The shifting movement of the swingably mounted frame is sufficient to lift the punches 20 and reciprocating mechanism therefor a sufficient distance to prevent engagement of said punches with the ground surface even when the same are reciprocated, thus of course permitting the machine to be power-driven along the ground without projecting the punches into perforating or ground-engaging position.

When aerating wet or soggy soil, there is a tendency for the punches to pick up the turf surrounding the same and produce a certain amount of tearing up of the lawn. In order to prevent this, we provide an adjustable stationary pressure structure having a plurality of transversely spaced pressure fingers 47 rigidly interconnected at their forward upper ends and journalled for adjustable oscillation on said rock shaft 38. The fingers 47 extend in rearwardly sloping relation downwardly from said rock shaft 37, as best shown in Fig. 3, and a tying member rigidly interconnects the same and extends rearwardly therefrom to a pair of adjustment brackets 49. The rear portions of the fingers 47 are disposed in substantially horizontal position and the elevation of said horizontal portions may be adjusted by vertical adjustment of the brackets 49 as best shown in Fig. 2. Suitable threaded studs are fixed to the transverse axle housing 8a and clamping nuts 51 securely clamp the brackets 49 in the desired vertically adjusted position.

In the event that a hard, impenetrable object is engaged by the lower end of one of the punches 20, we provide a pressure-releasing connection which, in the form shown, is disposed in the connecting rod assemblies 17 as best shown in Fig. 3. Each of said connecting rod assemblies 17 is formed from a pair of telescopically interconnected members 17a and 17b with abutment means for positively limiting the downward shifting movement of member 17b, the inner rod member 17b having a collar 17c at the upper end thereof and the outer sleeve member 17a having an inner stop sleeve 17d fixed in the lower portion thereof. A spring pressed ball 17e is shiftably mounted through the stop sleeve 17d and a compression spring 17f retained thereagainst by a threadably mounted adjustment pin 17g normally holds said rod 17b against shifting movement relative to sleeve 17a. A compression spring 17h serves to counterbalance a substantial portion of the force tending to cause relative shifting movement between the two members 17a and 17b and also serves to return said members back into extended position if an obstruction should cause the inner rod member 17b to shift upwardly within sleeve member 17a. A ball receiving recess is provided in the inner rod member 17b to receive the spring pressed ball 17e and normally hold said two members 17a and 17b against relative shifting movement. The pressure exerted by compression spring 17f is sufficient to only release rod member 17b if a relatively sudden, upwardly directed impact is produced thereon as by one of the punch members 20 striking a solid object.

The following is a description of the operation of our turf perforating and aerating machine. The motor 35 is started in the same way as most conventional gasoline engines and constantly drives the crank shaft 15 and cam shaft 28. However, the punches 20 are only reciprocated into ground penetrating position when the inner frame structure carried by frame members 11 is lowered into operative position by the bell crank and operative lever 41 which actuates the same. The over-center action of the C-shaped links positively locks said frame members 11 in operative position and interlocks the two frame structures to produce the necessary weight for penetrating the turf with the punches 20. The drive to the wheels 7 is controlled by the spline sleeve structure 33 and the operating lever 34 therefor. The normal practice would be to engage the wheel driving connection and then lower the inner frame into operative position. Thereafter, the machine requires little attention as it moves in a straight line across the golf green or turf being aerated. It is of course possible to guide the machine in any desired direction by the front steering wheel 9 and steering handle 10.

The punches 20 are hollow downwardly tapered tubular elements which are removably mounted in the mounting blocks 18b, as best shown in Fig. 6, and the crank shaft 15 is designed so that only one pair of punches are being projected into the ground at a time. Only in the event that one of said punches strikes a solid object, will impact be sufficient to release the spring-pressed ball 17e from the recess and permit the rod member 17b to shift upwardly within sleeve 17a and thus prevent injury to the machine, but normally presenting relative movement between the two members 17a and 17b. In the event that the impact is sufficient to release the ball 17e from the recess, the downward force exerted on the punch will be substantially reduced immediately and will not progressively increase as would be the case if only the spring 17h were provided with sufficient tension to project the punches into the ground. Obviously, the spring 17h could not be provided with sufficient compressive tension to prevent constant relative shifting movement between the two members 17a and 17b. The spring 17h returns the rod member 17b to extended position as soon as the punches are retracted from the ground. The combination of the tapered punches having a downwardly tapered inner passage therethrough with the downwardly tapered outer wall and the adjustably mounted pressure fingers 47 positively prevents any of the turf from being retained on the punches and thus prevents the pulling up and damaging of the turf even when the same is relatively wet. The plug members or cores 21 are easily removed by the successive cores punched out by the projection of the punch elements 20 into the ground and of course the tapered inner passage prevents clogging within said punches.

It will be seen that we have provided a highly efficient turf punching and aerating machine which is well adapted for use in either hard, dry ground since only two punches are projected downwardly at a time producing a maximum available projecting force, or in wet, soggy ground without damaging either the machine or the turf. The driving power for propelling the machine provides continuous movement at a substantially constant speed and the cams 27 and the horizontal punch shifting mechanism actuated thereby maintain the punches in stationary horizonal position while being penetrated into the turf. The provision for retracting the punches upwardly into inoperative position even while the same are being reciprocated is an important feature of our machine and the over-center positive locking of the bell crank actuating links 46 securely interconnects the frame members 11 with the stationary wheel supported frame members 5.

It will, of course, be understood that various changes may be made in the form, details, arrangement and proportions of the parts without departing from the scope of this invention which, generally stated, consists in the matter shown and described herein and set forth in the appended claims.

What we claim is:

1. A turf punching and aerating machine comprising a supporting structure, wheels underlying said supporting structure for carrying the same, a cam shaft journalled on the lower portion of said supporting structure and extending transversely thereacross, a plurality of transversely spaced peripheral cams mounted in fixed relation on said shaft for rotation therewith, a plurality of horizontally reciprocable cam followers respectively engaging the cam peripheries and disposed in substantially horizontally opposed relation to the cam shaft, a plurality of follower guides mounted in fixed relation on said supporting structure and providing longitudinal horizontally disposed guiding tracks for the respective followers, resilient means for maintaining contact between the respective followers and cam peripheries, a plurality of upstanding hollow guiding members respectively fixed to the cam followers for horizontal reciprocation therewith, a plurality of vertically reciprocable members respectively mounted for up and down sliding movement in each of said upstanding guiding members, at least one punch fixed to the bottom of each of said vertically reciprocable members, reciprocating mechanism connected with said vertically reciprocable members for actuating the same, a source of rotary power mounted on said supporting structure, and driving connections between said power source and said wheels, cam shaft, and reciprocating mechanism.

2. A turf punching and aerating machine comprising one frame structure with supporting wheels journaled thereunder, a second frame structure having a portion thereof shiftably mounted relative to said first mentioned frame structure, actuating means producing relative vertical shifting movement between the first and second frame structures, said actuating means consisting in a controllably swingable bell crank structure, and a C-shaped link structure interconnecting said bell crank structure and one of said frame structures, said bell crank structure being carried by the first frame structure and being constructed and arranged to be positioned in over center relation when the second frame structure is in lowered position relative to said first frame structure, and a stop element cooperatively associated with said C- shaped link structure to positively limit the over center movement of the bell crank and lock the second frame structure in downwardly projected position, a plurality of vertically reciprocable punching members, mechanism mounted on said second frame structure for producing vertical reciprocation of said punching members and operatively connected therewith in a manner to project the same downwardly into ground penetrating position only when said second frame structure is in lowered position relative to the first frame structure.

3. A turf punching and aerating machine comprising one frame structure with supporting wheels journaled thereunder, a second frame structure having a portion thereof shiftably mounted relative to said first mentioned frame structure, a link structure interconnecting said two frame structures, an over center type actuating mechanism cooperatively associated with said interconnecting link structure for swinging the same from upwardly retracted position into downwardly projected position, said actuating mechanism and said link structure being so constructed and arranged as to positively lock by an over center action said second frame structure into downwardly projected position, a plurality of vertically reciprocable punching members carried by said second frame structure in a manner to be projected into ground penetrating position when said second frame is shifted downwardly with respect to said first frame but being elevated above the ground even when reciprocated downwardly when said second frame is raised by said link structure.

References Cited in the file of this patent

UNITED STATES PATENTS

| | | |
|---|---|---|
| 275,146 | Clark | Apr. 3, 1883 |
| 1,224,717 | Darby et al. | May 1, 1917 |
| 1,624,610 | Matson | Apr. 21, 1927 |
| 2,193,575 | Thompson | Mar. 12, 1940 |
| 2,236,562 | Brandes | Apr. 1, 1941 |
| 2,255,040 | Helbig | Sept. 9, 1941 |
| 2,422,729 | Helbig | June 24, 1947 |
| 2,580,236 | Mascaro | Dec. 25, 1951 |
| 2,638,831 | Ferguson et al. | May 19, 1953 |

FOREIGN PATENTS

| | | |
|---|---|---|
| 408,370 | Great Britain | Apr. 12, 1934 |